United States Patent [19]

Arnold et al.

[11] Patent Number: 5,066,468
[45] Date of Patent: Nov. 19, 1991

[54] FOUNTAIN FOR THE RELEASE OF ACTIVE AGENTS INTO WATER DRAWN FROM WELLS

[75] Inventors: Jean-Claude Arnold, Clamart; Guy Cyprien, L'Hay Les Roses; Jean-Francois Olivere, Olivet, all of France

[73] Assignee: Rhone-Poulenc Chimie, Courbevoie, France

[21] Appl. No.: 386,267

[22] Filed: Jul. 28, 1989

[30] Foreign Application Priority Data

Jul. 29, 1988 [FR] France .................................. 88 10537

[51] Int. Cl.$^5$ .............................................. B01D 11/02
[52] U.S. Cl. ..................... 422/266; 210/205; 210/753; 166/68.5; 166/310; 137/268; 417/313; 422/264
[58] Field of Search ............... 210/203, 205, 310, 311, 210/753, 752, 754; 166/68.5, 75.1, 105, 310, 369; 422/266, 269, 264; 417/311, 313; 137/268; 222/190

[56] References Cited

U.S. PATENT DOCUMENTS

| | | | |
|---|---|---|---|
| 397,263 | 2/1889 | Woodworth | 210/424 |
| 562,151 | 6/1896 | Pierce | 210/456 |
| 1,757,140 | 5/1930 | Pulkinghorn | . |
| 2,891,622 | 6/1959 | Patterson et al. | 210/198.1 |
| 4,061,570 | 12/1977 | Fletcher et al. | 210/192 |
| 4,384,960 | 5/1983 | Polley | 210/753 |
| 4,548,227 | 10/1985 | Regunathan et al. | 137/268 |
| 4,555,347 | 11/1985 | O'Dowd et al. | 210/752 |

FOREIGN PATENT DOCUMENTS 1070350 7/1954 France .
1214044 4/1960 France .
2158162 11/1985 United Kingdom .

*Primary Examiner*—Peter Hruskoci
*Assistant Examiner*—Robert James Popovics
*Attorney, Agent, or Firm*—Burns, Doane, Swecker and Mathis

[57] ABSTRACT

Fountain permitting the release of active agents into water originating from a well, comprising a passage for circulating the water drawn from the well around a cartridge containing the active agent to be diffused and for keeping this cartridge immersed in water when water is not being drawn from the well.

7 Claims, 1 Drawing Sheet

FOUNTAIN FOR THE RELEASE OF ACTIVE AGENTS INTO WATER DRAWN FROM WELLS

FIELD OF THE INVENTION

The present invention relates to a specially designed fountain permitting the release of active agent(s) into the water drawn from wells.

It is of particular value, more specifically in countries such as, in particular, those of Latin America, the non-coastal countries of Africa and Asia (Pakistan, India, Nepal, China, Laos, etc.) and Australia, to be able to compensate for the iodine deficiencies in some village populations by increasing the iodine level, for example from pumps. These pumps are generally operated manually or with the aid of animals (water-wheel). Sometimes these pumps can operate by means of the electrical energy obtained from the sun (photovoltaic energy).

DESCRIPTION OF THE PRIOR ART

It is in fact possible to correct iodine deficiencies in certain populations by introducing into the drawn well water a "cartridge" containing an organic and/or inorganic iodine compound in a support based, for example, on silicon. Such products are described in French Patent Applications 87/02,882, 87/02,883 and 87/02,884 of the present assignee. In the particular case of the present application, it is considered that the active agent released is an iodine compound.

It has been found that the fountains currently known for dispensing water cannot be used for the convenient and controlled release of active agents into the water drawn from wells by means of pumps, it being understood that the fountain is generally considered as the part of a pump outside the well which makes it possible to pour the drawn water by means of a pouring spout.

Thus, an aspect of the present invention involves a fountain designed for the release of active substances into water coming from wells.

Another aspect of the present invention involves a fountain into which it is possible to introduce at least one "cartridge" containing the active agent(s) which it is desired to release into the water.

A further aspect of the present invention involves fountain from which the part of the cartridge forming the support for the active agent can be removed when the greater part of the active agent has passed (has been released) into the water poured by the pouring spout of the fountain.

Yet another aspect of the present invention relates to a fountain capable of being retro-fit, i.e., adapted to existing fountains, or alternatively being capable of replacing them.

Another aspect of the present invention involves a fountain in which the "cartridge" is not in danger of becoming dry when the pump is not operating.

A further aspect of the present invention concerns a fountain permitting the cartridge to be held in position (or to limit the displacement thereof) during the passage of the water drawn from the well.

SUMMARY OF THE INVENTION

In accordance with the present invention a fountain permitting the release of an active agent into water originating for example from wells, comprises means for channelling the flow of the water drawn from the well around a cartridge containing the active agent to be diffused and for keeping this cartridge permanently immersed in the water when the latter is not being drawn from the well.

A preferred embodiment of the present invention comprises a fountain permitting the release of an active agent into water originating from wells. The fountain includes a first compartment fed in its upper part by water drawn from the well, this water thus having a downward movement in this compartment. A second compartment is provided in which the water, coming from the first compartment arrives in the lower part of the second compartment, this water having a upward movement in this second compartment. The second compartment possesses, in its upper part a pouring spout via which the water emerges from the fountain after having circulated in contact with a least one cartridge arranged in at least one of the compartments. This cartridge contains the active agent which it is desired to release into the water.

BRIEF DESCRIPTION OF THE DRAWINGS

The description of the present invention will be better understood with reference to the attached figures which illustrate, diagrammatically and by way of non-limiting example, a preferred embodiment of the fountain to which the present invention relates.

DETAILED DESCRIPTION OF THE INVENTION

Figures 1, 2:
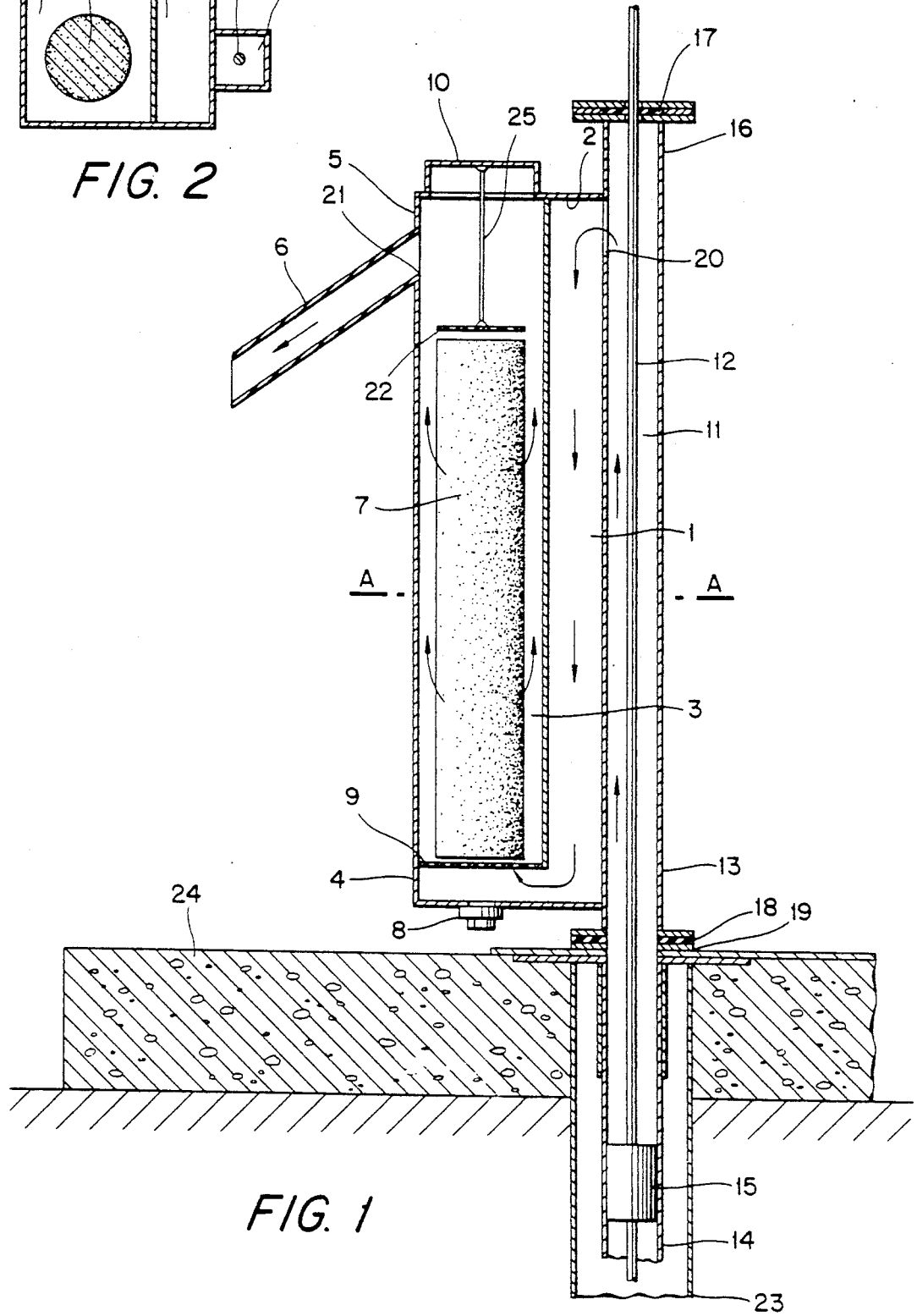
FIG. 1 is a schematic longitudinal sectional view through a well pump and fountain according to the present invention, the direction of water circulation being designated by arrows.
FIG. 2 is a cross sectional view taken along the line A—A in FIG. 1.

In accordance with the present invention a fountain comprises a compartment 1 fed in its upper part 2 by water coming from a compartment 11 in which is located a rod 12, i.e., a single rod or a "train of rods" 12 which are mutually fixed. The rod 12 extends downwardly beyond the lower part 13 of the compartment 11, and hence beyond the fountain, into a raising column 14 situated within a drilling tube 23 and hence within the ground. This rod 12 carries at least one piston 15, or preferably a number of pistons 15 set at a distance apart. The piston(s) moves within and in contact with the raising column 14. This type of self-priming pump with multiple pistons is conventional and is distributed by the company FORACO.

Below the raising column 14 is a diaphragm valve (not shown) preventing the water in the raising column 14 from returning to the water table when the rod 12 descends. In the upper part 16 of the compartment 11 are means 17 for sealingly guiding the rod 12. These means 17 are armed, for example, with two flanges between which is clamped a gasket in the central aperture through which the rod 12 is guided in a leak-tight manner.

The actuating means for setting the rod 12 in motion are not shown, since it does not form part of the fountain, but those skilled in the pump art know that, for example, such means may comprise a mast fixed to the base 24, for example of concrete, at the top of which mast is a pulley in the groove of which runs a cord connected to the end of the rod 12 and, for example, to a pumping lever, in the event that extraction of the water takes place manually.

The lower part or water inlet 13 of the compartment 11 comprises, in a known manner, means 18 creating a seal between the fountain and the casing head 10 of the pump, at the level of the upper part of the concrete base 24.

The water circulating downwardly in the passage defined by the compartment 1 passes into the lower part 4 of a passage defined by a compartment 3 whose upper part 5 comprises a pouring spout 6 from which the water emerges from the fountain. This compartment 3 comprises a cartridge 7 containing the active agent which is to be released into the water approaching the pouring spout 6. This compartment 3 possesses, in its lower part 4, a porous retainer 9 for retaining the cartridge 7. The retainer 9 may comprise for example, a grid or a perforated metal sheet. In its lower part 4, this compartment 3 further possesses a drain 8 for draining this compartment 3 if necessary, which drain comprises a threaded hole sealed by a drain plug 8. In its upper part 5, the compartment 3 possesses a passage sealed by a plug or cover 10 sized to make it possible to insert a cartridge 7 into the compartment 3 or remove it therefrom. This plug may possess a stop 22 making it possible to limit the displacement of the cartridge 7 during the upward passage of the water in the compartment 3. The stop 22 comprises a grid or perforated metal sheet, passing through the passage sealed by the plug 10, this grid being fixed to the plug by means of a rod 25 and a spring (not shown).

In the fountain described above, the point 20 where the water begins to pass from the compartment 11 to the compartment 1 is located substantially at the same level (elevation) relative to the ground as the point 21 where the water begins to emerge from the compartment 3 and enter the pouring spout 6. Both of those levels are above the upper end of the cartridge. If appropriate, the point 20 may be slightly higher, for example by 1 or 2 cm, than the point 21. Thus, the cartridge is kept immersed in water whenever water is not being circulated. This prevents the cartridge from drying out.

The fountain described above can be produced, in particular, from galvanized steel, aluminum or plastic, for example using commercially available hollow sections which are cut and welded or bonded together.

This fountain may be the subject of numerous alternative embodiments. It is, for example, possible to introduce a cartridge 7 into the compartment 1, which then would comprise a passage and a plug 10 and a retainer 9 for retaining the cartridge 7. If appropriate, this fountain can possess at least one cartridge 7 in each compartment 1 and 3.

The fountain as described and shown above can be used to equip new wells or, if necessary, to replace existing fountains which in fact possess only the compartment 11 in which is situated the rod 12 provided with a pouring spout in its upper part 2.

It must however be indicated that a retro-fit fountain according to the present invention can be attached to existing fountains which, as already stated in the preceding paragraph, possess only the compartment 11 and a pouring spout. For this purpose, a retro-fit fountain according to the present invention may possess the compartments 1 and 3 and a spout 6 as shown in the figure, and this fountain can then be fitted in a leak-tight manner at the upper part 2 of the compartment 1 to the pouring spout of the existing fountain. An adequate fixing system is of course envisaged. The upper part of the compartment 1 would then constitute the water inlet of the retro-fit fountain.

The fountain according to the present invention can be used to release into well water active agents making it possible to compensate for deficiencies affecting people, but it can also be used for other applications. For example, it can be used to release plant protection products into the water drawn from wells (introducing an appropriate cartridge into the fountain), this water then being used to treat plants or vegetables, for example.

Similarly, the fountain according to the present invention can be used to release into drawn well water active agents for the treatment of animals (husbandry).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A fountain for the release of an active agent into water originating from a well, comprising:
   a first compartment including an inlet at an upper end thereof for receiving well water and conducting the water downwardly,
   a second compartment including means at a lower end thereof for receiving water from a lower end of said first compartment and conducting the water upwardly,
   an outlet arranged at an upper end of said second compartment,
   a cartridge arranged in at least one of said first and second compartments for releasing an active agent into water flowing past said cartridge, both said inlet and outlet being located above an upper end of said cartridge so that said cartridge is kept in water when water is not being circulated through the fountain, and
   an additional compartment having an upper end communicating with said upper end of said first compartment and a lower end adapted to communicate with a well, a movable rod extending vertically through said additional compartment, a piston being carried by said rod and adapted to draw water up to said upper end of said additional compartment and into said upper end of said first compartment.

2. A fountain according to claim 1, wherein said cartridge is disposed in said second compartment, a drain being provided at said lower end of said second compartment.

3. A fountain according to claim 1, wherein said at least one compartment containing said cartridge includes a porous support supporting an underside of sad cartridge.

4. A fountain according to claim 1, wherein an upper end of said at least one compartment containing said cartridge includes a removable cover sized to permit the insertion and removal of said cartridge.

5. A fountain according to claim 2, wherein said cartridge is disposed in said second compartment which includes stop means of restraining upward movement of said cartridge during upward flow of water.

6. A fountain according to claim 1, wherein an upper end of said additional compartment includes means for sealingly guiding said rod.

7. A fountain according to claim 1 including a seal element at a lower end of said additional compartment and adapted to create a seal between said additional compartment and a well.

* * * * *